March 13, 1945.  N. M. SULLIVAN  2,371,557
SPECTACLE CASE
Filed June 30, 1941  2 Sheets-Sheet 2
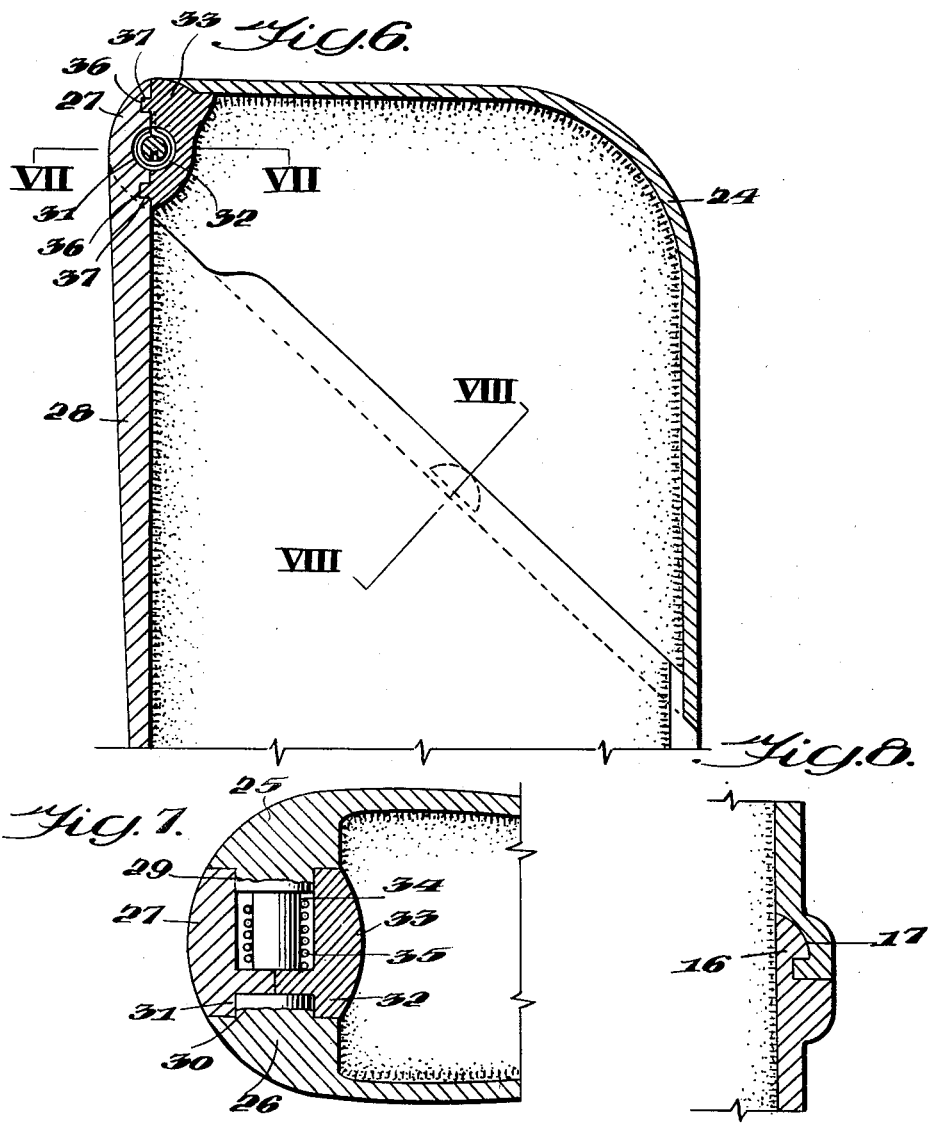
Inventor
NORMAN M. SULLIVAN
By H. S. McDowell
Attorney Patented Mar. 13, 1945

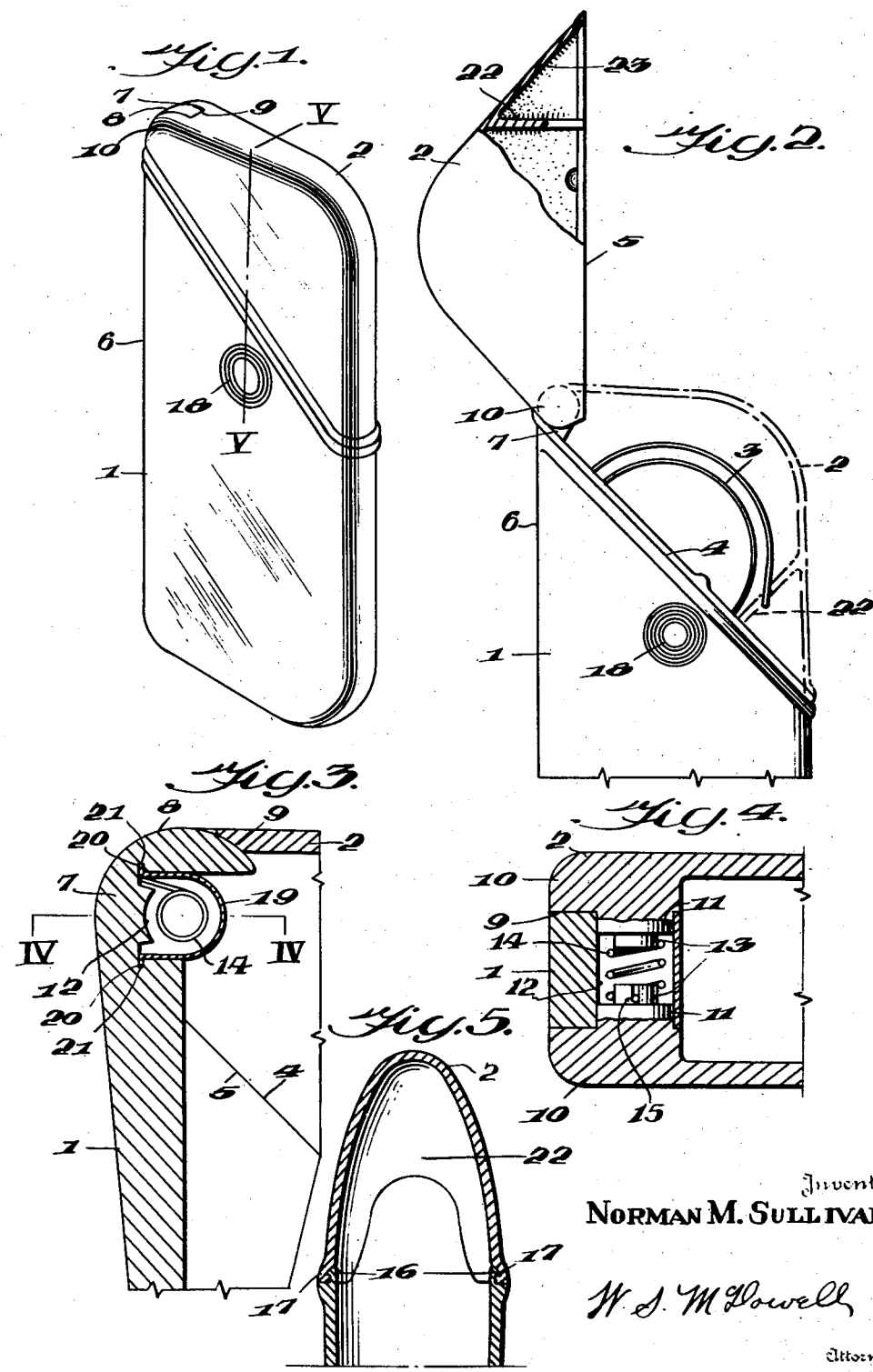

2,371,557

UNITED STATES PATENT OFFICE 2,371,557

SPECTACLE CASE

Norman M. Sullivan, Columbus, Ohio, assignor to Plastic Cases, Inc., Columbus, Ohio, a corporation of Ohio Application June 30, 1941, Serial No. 400,475

3 Claims. (Cl. 220—31)

This invention relates to eyeglass or spectacle cases, and an object thereof resides in the provision of an improved case formed to provide hingedly united base and cover sections of molded plastic composition materials, the case having substantially rigid walls and being characterized by its improved appearance, protection for the eyeglasses enclosed thereby and the ease and convenience with which the eyeglasses may be inserted into or removed from the case.

Another object of the invention resides in the provision of a case for the purposes set forth wherein the cover section is arranged at one end of the base, so that when the cover section is opened, a pair of spectacles or eyeglasses may be, in a very facile manner, inserted into or withdrawn from the base section through its open end, avoiding inconveniences and difficulties encountered with the conventional case of the rigid walled type having a hinged lid which covers one side of the case.

A further object resides in the provision of a case for eyeglasses and the like having the features of novelty above defined and wherein the meeting edges of the hingedly united base and cover sections are disposed at an acute angle with respect to the parallel side edges of said sections, the construction serving, when the cover is open, to cause a pair of spectacles positioned in the base section to project beyond the confines thereof where they may be conveniently grasped for removal.

A still further object resides in the provision of an improved spring actuated hinge construction for pivotally uniting the cover and base sections, the spring in said construction serving to automatically swing the cover section, when the latter is released by finger pressure applied to the base section, from its closed to its fully opened positions.

For a further understanding of the invention, reference is to be had to the following description and the accompanying drawings, wherein:

Fig. 1 is a perspective view of an eyeglass or spectacle case formed in accordance with the present invention;

Fig. 2 is a side elevational view of the upper portion of the case, disclosing the cover section in its open position in full lines and in its closed position by broken lines;

Fig. 3 is a detail vertical sectional view taken through the hinge construction for uniting the base and cover sections;

Fig. 4 is a detail horizontal sectional view taken through said hinge construction on the plane indicated by the line IV—IV of Fig. 3;

Fig. 5 is a detail vertical sectional view taken through the case on the plane indicated by the line V—V of Fig. 1;

Fig. 6 is a detail vertical sectional view taken through a slightly modified form of hinge construction for the case;

Fig. 7 is a horizontal sectional view on the line VII—VII of Fig. 6;

Fig. 8 is a detail sectional view on the line VIII—VIII of Fig. 6.

Referring more particularly to the drawings, and to the form of the invention illustrated in Figs. 1 to 5, inclusive, my improved spectacle case has been shown as comprising a base section 1 having hingedly united therewith a cover section 2. Preferably, these sections are molded from any one of a large number of so-called plastics now commercially available, such as the phenol formaldehyde resins, cellulose, casein, soya bean resins and the like. The walls of said sections are substantially rigid, as distinguished from flexible cases of leather.

The base section is formed to comprise an open-topped receptacle having a closed bottom and parallel side walls between which a pair of spectacles may be inserted. The open top of the base section instead of being parallel with the bottom is disposed at an acute angle with respect to the longer of the side walls, as shown more particularly in Fig. 2. Due to the inclination of this angular open end of the base section, and the length thereof, a pair of spectacles 3 positioned in the base section will project beyond the confines thereof, so that when the cover section is swung to occupy its open position, as in Fig. 2, the upper end of the spectacles will project beyond the inclined upper edge 4 of the base section, permitting the spectacles to be readily grasped and withdrawn from the case. Similar convenience is obtainable in the insertion of the spectacles into the case.

The cover section 2 has its lower edge 5 angularly disposed to mate with and seat against the correspondingly inclined edge 4 of the base section, so that when the cover section is closed, as in Fig. 1, the case will be substantially rectangular in configuration.

To hingedly unite the base and cover sections, the longer side wall 6 of the base section terminates at its upper end in an integral upstanding tongue 7. This tongue is formed with an arcuately shaped outer surface 8 which registers with a slot 9 provided in the cover section 2. The bifurcated walls 10 of the cover section, provided on the opposite sides of the slot 9, have their inner surfaces engaged with the side surfaces of the tongue 7. Also, the walls 10 are formed with inwardly extending fulcruming projections 11, which are received within an arcuate recess 12 formed with the inner surfaces of the tongue 7. The projections 11 terminate in studs 13, between and around which is positioned a coil spring 14. One end of this spring is received in a notch 15 provided in one of the studs 13, and the other end of the coil spring is engaged with a stationary part of the tongue 7.

This arrangement of the spring enables the same to cause the cover section to be automatically swung from its closed to its opened positions, when the cover section is manually released. To retain the cover section in its closed position, resisting the influence of the spring 14, the inclined edge 4 of the base section may be provided with hook-shaped projections 16, the outer ends of which projections are receivable within pockets 17 provided in the edge 5 of the cover section. When the side walls of the base section are pressed together by finger action applied to the molded buttons, indicated at 18, said side walls are sufficiently flexed to withdraw the projections 16 from the pockets 17, allowing the cover section to swing open through the action of the spring 14.

In closing the case, the cover section is forced downwardly by finger action and the projections 16 automatically snapped into the pockets 17 to hold the cover section against movement. The spring 14 may be enclosed and protected by means of a U-shaped plate 19. The ends of this plate are outturned as at 20 so that they may be snapped into notches 21 provided in the tongue 7. The cover section may be formed with a transversely extending reenforcing flange 22, which strengthens the cover section transversely and, also, is so positioned as to engage with the ear frames of the spectacles 3, as shown in Fig. 2, to hold the spectacles against undue movement in the case.

The case may be lined in any suitable way with a soft protecting material to prevent injury to the lenses or frames of the spectacles 3. In the manufacture of my improved case, I prefer to employ molded plastic materials in the composition thereof. The lining 23 may be produced by coating the interior of the case with a solvent of such plastic materials, such as acetone, toluene, or a mixture of such solvents in the event acetone has a tendency to dry too rapidly. Such a solvent when sprayed on the inner surfaces of the case sections, produces softening of the plastic materials comprising such inner surfaces. When in such a softened state, said surfaces are coated with a soft cellulose compound, known in the industry as flock, which, when dried, adheres to the inner surfaces of the case sections in a strongly retained permanent manner, producing a soft and durable lining.

In Figs. 6 and 7, a modified form of hinge construction has been illustrated. In this form of my invention, the cover section 24, contiguous to the hinged end thereof is bifurcated to provide spaced walls 25 and 26 which are arranged on opposite sides of a tongue 27 integrally formed with the base section 28. The wall 25 is provided with a cylindrical, inwardly extending projection 29. A similar projection 30 is formed with the wall 26. The projection 30 is received within a half-circular recess 31 provided in one side of the tongue 27, a mating recess 32 being formed in a plastic closure member 33, which is adhesively fastened to the inner surfaces of the tongue 27.

The projection 29 is formed with a stud extension 34, around which is positioned a coil spring 35. One end of this spring is fastened to the stud extension 34, while the opposite end of said spring is positioned in an opening provided therefor between the closure member 33 and the inner face of the tongue 27, as in Fig. 6. The inner face of the tongue 27 is formed with sockets 36 for the reception of positioning studs 37 carried by the closure member 33. In producing this construction, the cover section 24 is first applied to the tongue 27, with the spring 35 surrounding the stud 34. With the cover section in its opened position, the closure member 33 is adhesively connected with the inner surfaces of the tongue 27 enclosing and protecting the spring 35 and completing the bearings for the fulcruming projections 29 and 30. Except for these differences in hinge construction, the spectacle case disclosed in Figs. 6 and 7 is structurally and operatively the same as that illustrated in Figs. 1 to 4.

In view of the foregoing, it will be seen that the present invention provides an improved spectacle case which may be readily carried in the pockets of the user in a compact, convenient manner. The case may be economically produced, preferably from molded plastic materials, which produce a receptacle having walls of the desired rigidity for the adequate protection of eyeglasses or spectacles received therein. Moreover, the case may be produced in many colors of desired selection to impart an attractive external appearance thereto. Since the colors are permanent, the case maintains its attractive appearance throughout prolonged periods of use. The spring hinge construction also enables the case to be readily opened in a virtually automatic manner, and also due to the inclined edges of the case sections, improved facility is to be had in the matter of withdrawing spectacles from the case or inserting the same therein.

What is claimed is:

1. In a spectacle case, base and cover sections, a hinge union between said sections comprising an upstanding tongue on said base section, said tongue having bearing recesses formed in the inner face thereof, cylindrical bearing projections formed with the cover section and rotatably received in said recesses, a separate recessed member secured to said tongue, said member coacting with the recesses of said tongue to furnish bearing support for the bearing projections, and a coil spring axially aligned with said projections and arranged between said tongue and recessed member, said spring serving to move said cover section when the latter is released from engagement with the base section to a case-opening position.

2. In a spectacle case, base and cover sections, a hinge union between said sections comprising an upstanding tongue on the base section, said tongue having bearing recesses formed in the inner face thereof, oppositely disposed and longitudinally aligned bearing projections formed with the cover section and rotatably positioned in said recesses, a substantially U-shaped recessed member secured to said tongue, said member coacting with the recesses of said tongue to furnish bearing support for the bearing projections of the cover section, and a coil spring surrounding said projections and concealed by the recessed member, one end of said spring having engagement with one of said bearing projections and the opposite end of said spring having engagement with said base section.

3. In a spectacle case having a body section and a movable cover section, hinge means for uniting said sections comprising a tongue projecting from said body section into said cover section, said tongue having bearing recesses formed in the inner face thereof, oppositely disposed and longitudinally aligned bearing projections formed with the cover section and rotatably positioned in the recesses of said tongue, a separate recessed member having semicylindrical recesses formed in the inner face thereof, said member being secured to said tongue with the recesses therein coacting with the recesses in said tongue to furnish bearing support for the bearing projections of the cover section, a coil spring surrounding one of said bearing projections and located in complemental recesses of said tongue and recessed member, said spring having one end thereof engaged with said body section and the other end thereof engaged with said cover section and tending normally to move said cover section to an open position, and the meeting edges of said body and cover sections being disposed on an inclined plane extending from approximately the hinge union to the opposite side of the case.

NORMAN M. SULLIVAN.